United States Patent [19]

Ramsay et al.

[11] Patent Number: 4,490,446
[45] Date of Patent: Dec. 25, 1984

[54] PREVENTION OF OVERPRESSURIZATION OF LITHIUM-THIONYL CHLORIDE BATTERY CELLS

[75] Inventors: Glynn R. Ramsay, Dundee, Ill.; Dennis J. Salmon, Gastonia, N.C.

[73] Assignee: Gould Inc., Rolling Meadows, Ill.

[21] Appl. No.: 450,580

[22] Filed: Dec. 17, 1982

[51] Int. Cl.$^3$ .................. H01M 10/34; H01M 6/14; H01M 6/04

[52] U.S. Cl. .................. 429/57; 429/101; 429/196; 429/199; 429/218

[58] Field of Search .................. 429/57, 59, 101, 194, 429/196, 197, 199, 218

[56] References Cited

U.S. PATENT DOCUMENTS 4,262,065  4/1981  Giattino .................. 429/101
4,293,622  10/1981  Marancic et al. .................. 429/101
4,296,185  10/1981  Catanzarite .................. 429/101
4,360,572  11/1982  Chua et al. .................. 429/101

*Primary Examiner*—Brian E. Hearn
*Assistant Examiner*—Gerard P. Rooney, Jr.

[57] ABSTRACT

A method of preventing overpressurization of a lithium-thionyl chloride battery cell by formation of excessive $SO_2$ during high rate discharge. The method comprises the step of providing $PCl_5$ in the cathode. Alternatively, the $PCl_5$ may be provided in the electrolyte or in both the cathode and electrolyte as desired. The $PCl_5$ may be incorporated in the cathode by introduction thereof into the porous carbon structure of a preformed carbon element. Alternatively, the $PCl_5$ may be dry mixed with the carbon and the mixture formed into the desired cathode element.

12 Claims, No Drawings

PREVENTION OF OVERPRESSURIZATION OF LITHIUM-THIONYL CHLORIDE BATTERY CELLS

DESCRIPTION

1. Technical Field

This invention relates to battery cell manufacture and in particular to the prevention of overpressurization of a lithium thionyl chloride battery cell as by formation of excessive $SO_2$ during high rate discharge.

2. Background Art

One conventional form of battery cell comprises a lithium thionyl chloride cell having an anode formed of lithium foil carried on a collector plate formed of thin nickel. The cathode comprises a carbon electrode separated from the anode by a piece of alumina cloth. The carbon cathode is pressed against a current collector and the entire assembly is compressed between a pair of pressure plates. The cell is evacuated and filled with 1.5 Molar solution of lithium chloride and aluminum chloride in thionyl chloride electrolyte.

The cell is provided in suitable sealed housing.

At high rates of discharge, $SO_2$ gas is produced according to the equation:

$$4Li + SOCl_2 \rightarrow 4LiCl + SO_2 + S.$$

Normally, the $SO_2$ dissolves in the electrolyte until saturation is reached. However, as the electrolyte is consumed and the saturation point is exceeded, $SO_2$ comes out of the solution and the cell pressure increases, at times to the point where the cell case ruptures.

In multicell lithium-thionyl chloride batteries, a substantial and expensive structure must be provided to prevent such battery case rupture. The need for such structure reduces the volume and capacity of the battery while substantially increasing undesirably the weight thereof.

DISCLOSURE OF INVENTION

The present invention comprehends an improved lithium-thionyl chloride cell manufacture which effectively prevents such $SO_2$ pressurization, thereby obviating the need for the conventional reinforcing structure.

More specifically, the invention comprehends the provision of a lithium-thionyl chloride battery cell wherein the cathode comprises a porous structure having $PCl_5$ distributed therein.

In the illustrated embodiment, the cathode comprises a porous carbon cathode having $PCl_5$ distributed therein.

The invention comprehends the novel method of preventing overpressurization of a lithium-thionyl chloride battery cell by formation of excessive $SO_2$ during high rate discharge comprising the provision of $PCl_5$ in the cathode.

In the illustrated embodiment, the $PCl_5$ is incorporated in porous carbon cathode structure prior to assembly of the cathode into the battery cell.

In the illustrative embodiment, the carbon structure is formed under vacuum to define a porous element, with the $PCl_5$ distributed in powdered form into the porous structure.

In the illustrated embodiment, the $PCl_5$ is sprinkle-shaken into the porous structure.

The invention further comprehends the novel method of preventing overpressurization of a lithium-thionyl chloride battery cell by formation of excessive $SO_2$ during high rate discharge by providing $PCl_5$ in the electrolyte of the battery cell.

In the illustrated embodiment, the $PCl_5$ is dissolved in the electrolyte prior to the provision of the electrolyte in the battery cell.

The invention comprehends the further provision of $PCl_5$ incorporated in the cathode prior to assembly of the battery cell containing the $PCl_5$ in the electrolyte.

Broadly, the invention comprehends the provision of $PCl_5$ in a lithium-thionyl chloride battery cell to react with $SO_2$ produced during high rate discharge thereof to form $SOCl_2$ and $POCl_3$ liquid products to effectively prevent overpressurization of the cell by the produced $SO_2$.

Other features and advantages of the invention will be apparent to those skilled in the art in the following detailed description taken in conjunction with the appended claims.

BEST MODE FOR CARRYING OUT THE INVENTION

The present invention comprehends a method of preventing overpressurization of a lithium-thionyl chloride battery cell by formation of excessive $SO_2$ during high rate discharge. The invention comprehends the provision of $PCl_5$ to react with the developed $SO_2$ as per $$SO_2 + PCl_5 \rightarrow SOCl_2 + POCl_3.$$

As only liquid products are produced by the above reaction, overpressurization of the cell by the developed $SO_2$ is effectively prevented.

The invention comprehends that the $PCl_5$ be distributed in the cathode structure in one form, and alternatively, be provided in the electrolyte in another embodiment of the invention.

It has been found that by means of the $PCl_5$ additive substantially no pressure increase in the high rate discharge of a lithium-thionyl chloride battery cell occurs, thereby effectively avoiding rupture of the battery case without need for increased reinforcement and, thus, minimizing weight requirements and cost.

EXAMPLE

A lithium-thionyl chloride cell structure was prepared utilizing a 4.5" diameter disc-shaped anode current collector plate of thin nickel, a disc-shaped anode of lithium foil, a disc-shaped piece of alumina cloth, and a disc-shaped porous carbon matrix cathode. The alumina cloth was disposed between the lithium foil and the cathode to serve as a separator therebetween.

The carbon matrix cathode was pressed against a disc-shaped cathode current collector. The assembly was retained between two pressure plates. A 4.5" diameter Teflon O ring was placed between the current collector plates to form a hermetic seal upon placement in a suitable housing. The housing was evacuated through a tube soldered to the rear of each end plate. After evacuation, an electrolyte consisting of 1.5 Molar solution of lithium chloride and aluminum chloride in thionyl chloride was flushed through the cell until the cell space was filled.

In forming the carbon cathode, the cathode was prepared from particulate carbon compressed to the desired shape and thoroughly dried under vacuum and heat. PCl$_5$ powder was sprinkled/shaken into the porous carbon structure to provide a distribution of the PCl$_5$ therethrough.

The lithium-thionyl chloride battery cell so constructed was discharged by means of a constant current source at a rate of over 20 mA/cm$^2$. In a similar lithium thionyl chloride battery cell without the provision of the additive PCl$_5$, discharged at such a rate, sufficient SO$_2$ was developed to rupture the cell seal with loss of electrolyte and exposure of the cell reactant to the atmosphere. This reaction was per $$4Li + 2SOCl_2 \rightarrow 4LiCl + SO_2 + S.$$

Where the PCl$_5$ additive was included, the developed SO$_2$ was immediately reacted with the PCl$_5$ as per $$SO_2 + PCl_5 \rightarrow SOCl_2 + POCl_3$$

so that only liquid products resulted. There was substantially no increase in pressure due to free SO$_2$.

Additionally, the provision of the PCl$_5$ additive was shown to increase the cell capacity due to the formation of additional SOCl$_2$.

It will be apparent from the foregoing that high discharge rates may be effected in lithium-thionyl chloride battery cells without overpressurization of the cell by formation of excessive SO$_2$ by means of the provision of the PCl$_5$ additive, as discussed above. As indicated, the additive may be included directly in the carbon cathode, or alternatively, may be provided as a component of the electrolyte. Not only does the additive avoid such overpressurization, but causes synergistically an increase in the cell capacity due to the formation of new SOCl$_2$ during such high rate discharge. The PCl$_5$ may be provided by either method or by provision both in the cathode and the electrolyte as desired.

The foregoing detailed description is given for clearness of understanding only, and no unnecessary limitation should be understood therefrom, as modifications within the scope of the invention will be obvious to those skilled in the art.

We claim:

1. The method of preventing overpressurization of a lithium-thionyl chloride battery cell by formation of excessive SO$_2$ during high rate discharge and thereby increasing the capacity of the cell, said method comprising the step of providing powdered PCl$_5$ in the cathode of said cell to react with said excessive SO$_2$ to form soluble products.

2. The method of claim 1 wherein said cathode comprises a porous cathode structure and the PCl$_5$ is incorporated therein prior to assembly into the battery cell.

3. The method of claim 1 wherein said cathode comprises a porous carbon cathode structure and the PCl$_5$ is incorporated therein prior to assembly into the battery cell.

4. The method of claim 3 wherein said PCl$_5$ is incorporated in said cathode structure by the steps of forming the cathode under vacuum and with applied heat to form a porous structure and distributing powdered PCl$_5$ into the porous structure.

5. The method of claim 3 wherein said PCl$_5$ is incorporated in said cathode structure by the steps of forming the cathode under vacuum and with applied heat to form a porous structure and distributing powdered PCl$_5$ into the porous structure by sprinkle/shaking the PCl$_5$ into the porous structure.

6. The method of claim 3 wherein said PCl$_5$ is incorporated in said cathode structure by the step of mixing PCl$_5$ with particulate carbon.

7. The method of claim 3 wherein said PCl$_5$ is incorporated in said cathode structure by the steps of mixing PCl$_5$ with particulate carbon and pressing the mixture onto a current collector.

8. The method of claim 3 wherein said PCl$_5$ is incorporated in said cathode structure by the step of dry mixing PCl$_5$ with particulate carbon.

9. A lithium-thionyl chloride battery cell wherein the cathode comprises a porous structure having PCl$_5$ distributed therein.

10. The lithium-thionyl chloride battery cell of claim 9 wherein said cathode comprises a porous carbon cathode having said PCl$_5$ distributed therein.

11. A lithium-thionyl chloride battery cell wherein the electrolyte comprises a mixture of lithium chloride, aluminum chloride, and phosphorus pentachloride in thionyl chloride and wherein the battery cell includes a carbon cathode and additional phosphorous pentachloride is distributed in said cathode.

12. The method of preventing overpressurization of a lithium-thionyl chloride battery cell by formation of excessive SO$_2$ during high rate discharge and thereby increasing the capacity of the cell, comprising the step of providing PCl$_5$ in the electrolyte of the battery cell, and also in the cathode prior to assembly thereof into the battery cell.

* * * * *